United States Patent
Krüsemann

(10) Patent No.: US 8,512,785 B2
(45) Date of Patent: Aug. 20, 2013

(54) DEVICE AND A METHOD FOR THE MICRO-PARTICULATION OF FILTER RESIDUES

(75) Inventor: Dieter Krüsemann, Hamburg (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 472 days.

(21) Appl. No.: 11/660,618

(22) PCT Filed: Aug. 17, 2005

(86) PCT No.: PCT/EP2005/008911
§ 371 (c)(1),
(2), (4) Date: Feb. 20, 2007

(87) PCT Pub. No.: WO2006/024395
PCT Pub. Date: Mar. 9, 2006

(65) Prior Publication Data
US 2008/0038424 A1    Feb. 14, 2008

(30) Foreign Application Priority Data
Aug. 28, 2004 (DE) .......................... 10 2004 041 770

(51) Int. Cl.
*A23L 1/10* (2006.01)
(52) U.S. Cl.
USPC ........... 426/465; 426/464; 426/478; 426/491; 426/656; 426/583; 426/519; 426/520
(58) Field of Classification Search
USPC ................. 426/464, 465, 478, 491, 656, 583, 426/519, 520; 99/453
See application file for complete search history.

(56) References Cited

U.S. PATENT DOCUMENTS

| 3,079,263 A * | 2/1963 | Foster, Jr. et al. ............... 426/39 |
| 3,615,663 A * | 10/1971 | Becker .......................... 426/471 |
| 3,846,570 A * | 11/1974 | Vetter et al. .................... 426/399 |
| 4,190,721 A | 2/1980 | Hertel |

(Continued)

FOREIGN PATENT DOCUMENTS

| DE | 1 113 928 C | 4/1962 |
| DE | 1 192 157 C | 1/1966 |

(Continued)

OTHER PUBLICATIONS

Spiegel, Thomas, "Thermal denaturisation and aggregation of whey proteins in ultra-filtration whey concentrates—reaction kinetics and particulation in the scraped surface heat exchanger," Shaker Publishing House, 1999, pp. 1-150. (Spec, p. 1).

*Primary Examiner* — Drew Becker
*Assistant Examiner* — Preston Smith
(74) *Attorney, Agent, or Firm* — Finnegan, Henderson, Farabow, Garrett & Dunner, LLP

(57) ABSTRACT

In order to specify a device (1) and a method for the microparticulation of filtration residues comprising a mechanical treatment and a heat treatment, in particular of whey proteins in ultra-filtration whey concentrates, which in each case permit a particularly high yield of particles in a preselectable size range in a manner which spares resources, it is suggested to provide a separate heat treatment device (5) as well as a separate mechanical treatment device (9) or for the heat treatment and the mechanical treatment to be carried out separately from one another with respect to space and time.

5 Claims, 3 Drawing Sheets

(56) References Cited

U.S. PATENT DOCUMENTS

| | | | |
|---|---|---|---|
| 4,814,189 A * | 3/1989 | Laude-Bousquet | 426/15 |
| 4,989,988 A * | 2/1991 | Hutter et al. | 366/181.5 |
| 5,356,639 A | 10/1994 | Jameson et al. | |
| 5,494,696 A * | 2/1996 | Holst et al. | 426/583 |
| 5,503,864 A * | 4/1996 | Uchida et al. | 426/583 |
| 5,887,971 A * | 3/1999 | Gandini et al. | 366/176.2 |
| 6,270,823 B1 | 8/2001 | Jolkin | |
| 6,623,781 B2 * | 9/2003 | Rizvi et al. | 426/599 |
| 6,767,575 B1 | 7/2004 | Huss et al. | |
| 2004/0042336 A1 | 3/2004 | Kozyuk | |

FOREIGN PATENT DOCUMENTS

| | | |
|---|---|---|
| DE | 44 23 796 | 1/1996 |
| DE | 199 06 379 | 8/2000 |
| EP | 1 052 910 B1 | 1/2004 |
| EP | 1 073 347 B1 | 2/2004 |
| FR | 2361825 | 3/1978 |
| FR | 2567366 | 1/1986 |

* cited by examiner

DEVICE AND A METHOD FOR THE MICRO-PARTICULATION OF FILTER RESIDUES

CROSS REFERENCE TO RELATED APPLICATIONS

Applicant claims priority under 35 U.S.C. §119 of German Application No. 10 2004 041 770.9 filed Aug. 28, 2004. Applicant also claims priority under 35 U.S.C. §365 of PCT/EP2005/008911 filed Aug. 17, 2005. The international application under PCT article 21(2) was not published in English.

BACKGROUND OF THE INVENTION

1. Field of the Invention

The present invention relates to a device and a method for the micro-particulation of filtration residues comprising a mechanical treatment and a heat treatment, in particular of whey proteins in ultra-filtration whey concentrates.

2. The Prior Art

Such a device for the micro-particulation is for example known from the dissertation paper "Thermische Denaturierung und Aggregation von Molkenproteinen in Ultrafiltrationsmolkenkonzentraten—Reaktionskinetik und Partikulieren im Schabewaermetauscher" ("Thermal denaturisation and aggregation of whey proteins in ultra-filtration whey concentrates—reaction kinetics and particulation in the scraped surface heat exchanger") appearing in the Shaker publishing house under ISBN 3-8265-6233-X in the year 1999.

It is the goal of particulation to create filtration residues, such as e.g. whey protein particles in a size range of a few micrometers. This is generally achieved by a combination of the heat-induced denaturisation and aggregation of the whey proteins, with a mechanical size reduction of the particles. Thus one utilises the superposition of the two procedures of aggregation and particle breakdown, which counteract one another, for the particulation process, in order to obtain a certain size distribution of the particles.

By way of particulation, the filtration residue or specially the whey protein aggregate may be adapted to the specific demands for different types of products. For example, whey proteins in the form of aggregates may be integrated into a cheese matrix in the size range of a few micrometers. The yield is increased, and the texture properties, in particular of low-fat cheeses, are improved. The application in cheese requires particles sizes below 10 µm for example.

The aggregates obtained by particulation, in a certain, as narrow as possible size range, may for example also be used in the manufacture of milk desserts or ice cream in an analogous manner.

With the device for micro-particulation, which is known from the above mentioned dissertation paper, the heat-treatment procedure as well as the procedure for mechanical processing, which means the mechanical size reduction of the particles, are carried out simultaneously in a coupled manner in one and the same apparatus. Thereby, according to the cited state of the art, a scraped surface heat exchanger is applied, in which the whey proteins are introduced from the ultra-filtration whey concentrate. In the scraped surface heat exchanger, the filtration residue on the one hand is heated by the thermal transfer at the transfer surface of the scraped surface heat exchanger. On the other hand, scrapers revolving within the scraped surface heat exchanger produce a shear force, by which means a mechanical size reduction of the particles is achieved.

The disadvantage of this device or with this method for the micro-particulation, is however the fact that the process of the heating, by way of which an aggregate formation is created, is directly coupled to the procedure of the mechanical size reduction. Thus, the heat transfer onto the filtration residue may disadvantageously only be varied by increasing the revolving frequency of the scrapers, which however unavoidably leads to a change in the mechanical size reduction effect. Thus disadvantageously, the counter-running procedures of the aggregation caused by heat treatment, and the size reduction caused by the mechanical shear loading, may not be influenced as independent parameters of the process. This has the disadvantage that it is generally not possible to manufacture particles in a preselected and tight size range. Since furthermore, the size reduction of the particles is only activated with the known method in the scraped surface heat exchanger by way of intensive shear loading, the defined selection of a desired, defined particles size is not possible a priori. Instead, the design and selection of the operating parameters must be effected in an essentially empirical manner. Furthermore, the rotor with the scrapers must be operated at a very high rotational speed for the production of particularly small size ranges of a few micrometers, which are of interest for the mentioned applications. This has the disadvantage that the wear of the scraped surface heat exchanger is particularly large. Furthermore, the operation at a high revolving speed leads to an increased energy consumption.

SUMMARY OF THE INVENTION

It is therefore the object of the present invention to specify a device and a method for a micro-particulation of filtration residues comprising a mechanical treatment and a heat treatment, in particular of whey proteins in ultra-filtration whey concentrates, which permit a particularly high yield of particles in a preselectable size range, in a manner which takes particular note of resources.

According to the invention, this object is achieved in that with a device for micro-particulation of filtration residues comprising a mechanical treatment and a heat treatment, in particular of whey proteins in ultra-filtration whey concentrates, a separate heat treatment device as well as a separate mechanical treatment device are provided. In this manner, it is advantageously possible to vary the heating as well as the mechanical treatment in a targeted manner, as parameters which are independent of one another.

A desired size range of the particles may be manufactured in a precise manner by way of this. The yield of particles within the required particle size interval is thus advantageously improved. By way of the fact that a separate mechanical treatment device is provided, a desired particles size may be preselected over a larger range than with the state of the art. It is further advantageous that the scraped surface heat exchanger does not need to be driven at a high rotational speed, which leads to a significantly reduced wear of this apparatus.

According to the invention, it is particularly favourable when the heat treatment device is arranged upstream of the mechanical treatment device. By way of this, an aggregation of the whey proteins is advantageously effected in the first step. Only after this aggregation procedure is finished, is the mechanical size reduction of the aggregates again effected amid very precise parameters, which may be selected independently of the heating procedure.

The micro-particulation device according to the invention is improved even more if a sojourn stretch is arranged between the heat treatment device and the mechanical treatment device. Advantageously, the aggregation procedure may be brought fully to its completion outside the scraped surface heat exchanger, before the mechanical size reduction is effected. Thus advantageously, one avoids an aggregation continuing to be effected after the effected mechanical size reduction, which would undesirably adulterate the desired size distribution.

In a further formation of the invention, the sojourn path is designed as a pipe loop. Advantageously, by way of this, an intermediate storage between the heat treatment device and the mechanical treatment device may be prepared without great costs.

According to a special embodiment of the micro-particulation device according to the invention, the heat treatment device is designed as a scraped surface heat exchanger. With a scraped surface heat exchanger, a revolving scraper constantly produces a new, thin product film on the exchanger surface. This has the advantage that the thermal loading and thus the deposit formation of the product on the heating surface is accordingly low. This advantageously leads to a very effective heat transfer with a low thermal loading, in particular of sensitive products.

The scraped surface heat exchanger is connected to a heating water circuit in a further formation of the invention. The heating water circuit may advantageously be led through an annular gap between an inner cylinder and an outer insulation casing of the scraped surface heat exchanger. The filtration residue, in particular the whey proteins in an ultra-filtration whey concentrate, may in this manner be advantageously heated in the scraped surface heat exchanger to the desired temperature. The heating water circuit permits a significantly more accurate setting of the temperature at the heat transfer surface of the scraped surface heat exchanger than this would be possible with the use of steam as a heating medium. By way of this, one avoids the burning-on of the residue, which would, amongst other things, result in the operational duration of the scraped surface heat exchanger between cleanings being greatly reduced, or burnt-on particles detaching and getting into the end product, where they would cause undesired decolouration.

It is particularly favourable for the consumption and gentle for the wear of the scraped surface heat exchanger if, in a special embodiment of the present invention, the scraped surface heat exchanger is designed for operation at a low rotational speed.

In a further formation of the micro-particulation device according to the invention, it is envisaged to design the mechanical treatment device as a homogeniser. Homogenisers are a means for homogenisation, which have been tried and tested in practice. Thereby, in particular, also a size reduction of particularly large particles of products, in particular filter residues, such a whey proteins in ultra-filtration whey concentrates is effected.

In a special formation of the invention, the homogeniser comprises a gap passage for the filtration residue, with a width which is constant over its extension. This has the advantage that it is ensured that any filtration residue which goes through the homogeniser, has a maximal particle size predefined by the width of the gap passage. The provision of a constant width over the complete extension of the gap passage furthermore ensures that this maximal particles size is ensured independently of the location at which the respective particles have entered through the gap passage.

According to a particularly advantageous embodiment of the invention, the gap passage is designed in an annular manner. By way of the provision of an annular gap passage, one may achieve a high product through-flow with a given passage width, whilst retaining particularly favourable outer dimensions of the homogeniser.

In order to permit a particularly broad field of application of the micro-particulation device according to the invention, it is envisaged for the width of the gap passage to be designed in a variably settable manner. In this manner, whilst retaining the properties with regard to the particle size reduction which have been mentioned further above, one succeeds in the average of the tight particle size distribution being able to be shifted according to wish, over a large range which is given by the setting of the gap width. By way of this, advantageously the micro-particulation device according to the invention may be adapted to the treatment of filtration residues for different applications, by which means the economics are advantageously influenced.

In one formation of the invention, a plate heat exchanger for a heat exchange between the filtration residues is additionally provided at the end product of the micro-particulation. By way of this variant which is particularly favourable with regard to energy, the filtration residue is already preheated before entry into the scraped surface heat exchanger or into the other heat treatment device, wherein simultaneously, the end product of the micro-particulation coming from the homogeniser exit, is cooled further. In particular, it is advantageously ensured that no further aggregation procedures take their course in the end product.

The object on which the invention is based is solved to the same extent by a method for the micro-particulation of filtration residues, in particular of whey proteins in ultra-filtration whey concentrates, comprises a mechanical treatment and a heat treatment, with which the heat treatment and the mechanical treatment are carried out separately form one another with regard to space and time.

With a further formation of the micro-particulation method according to the invention, the heat treatment is carried out before the mechanical treatment.

In a special design of the micro-particulation method according to the invention, the filtration residue is intermediately stored in a storage volume after the heat treatment and before the mechanical treatment.

A particularly favourable further formation of the micro-particulation method according to the invention is obtained when the filtration residue is intermediately stored in a sojourn stretch. By way of this, a retention of the residue over a defined time at the temperature level is achieved after the scraped surface heat exchanger, in order in this manner to conclude the aggregate formation for an as large as possible share of the residue.

In a further design of the micro-particulation method according to the invention, the heat treatment is carried out in a scraped surface heat exchanger.

Thereby, it is particularly favourable if the scraped surface heat exchanger is heated by a heating water circuit.

The micro-particulation method according to the invention may be designed in a particularly energy-saving and low-wear manner if, according to the invention, the scraped surface heat exchanger is operated as a low rotational speed. The operation of the scraped surface heat exchanger at a low rotational speed is advantageously possible according to the invention, since the mechanical processing of the particles, according to the invention, is not effected in the scraped surface heat exchanger. Accordingly, advantageously with the selection of the rotational speed of the scraped surface heat exchanger, aspects which do not relate to its optimal operation need be taken into account.

With a further advantageous design variant of the micro-particulation method according to the invention, the mechanical treatment is carried out in a homogeniser.

In order to obtain a particularly high throughput of filtration residue, a special design of the micro-particulation method according to the invention envisages the mechanical treatment being carried out in a homogeniser with an annular gap passage.

Another particularly energy-efficient variant of the micro-particulation method according to the invention envisages a heat exchange being additionally carried out between the filtration residue and an end product of the micro-particulation.

Further advantages of the method according to the invention are to be found in the further description of the device for micro-particulation according to the invention.

BRIEF DESCRIPTION OF THE DRAWINGS

The invention is described by way of example in a preferred embodiment with reference to the drawings, wherein further advantageous details are to be deduced from the figures of the drawing.

Parts which are the same with regard to functioning are thereby provided with the same reference numerals.

The figures of the drawings individually shown in

Figure 1:
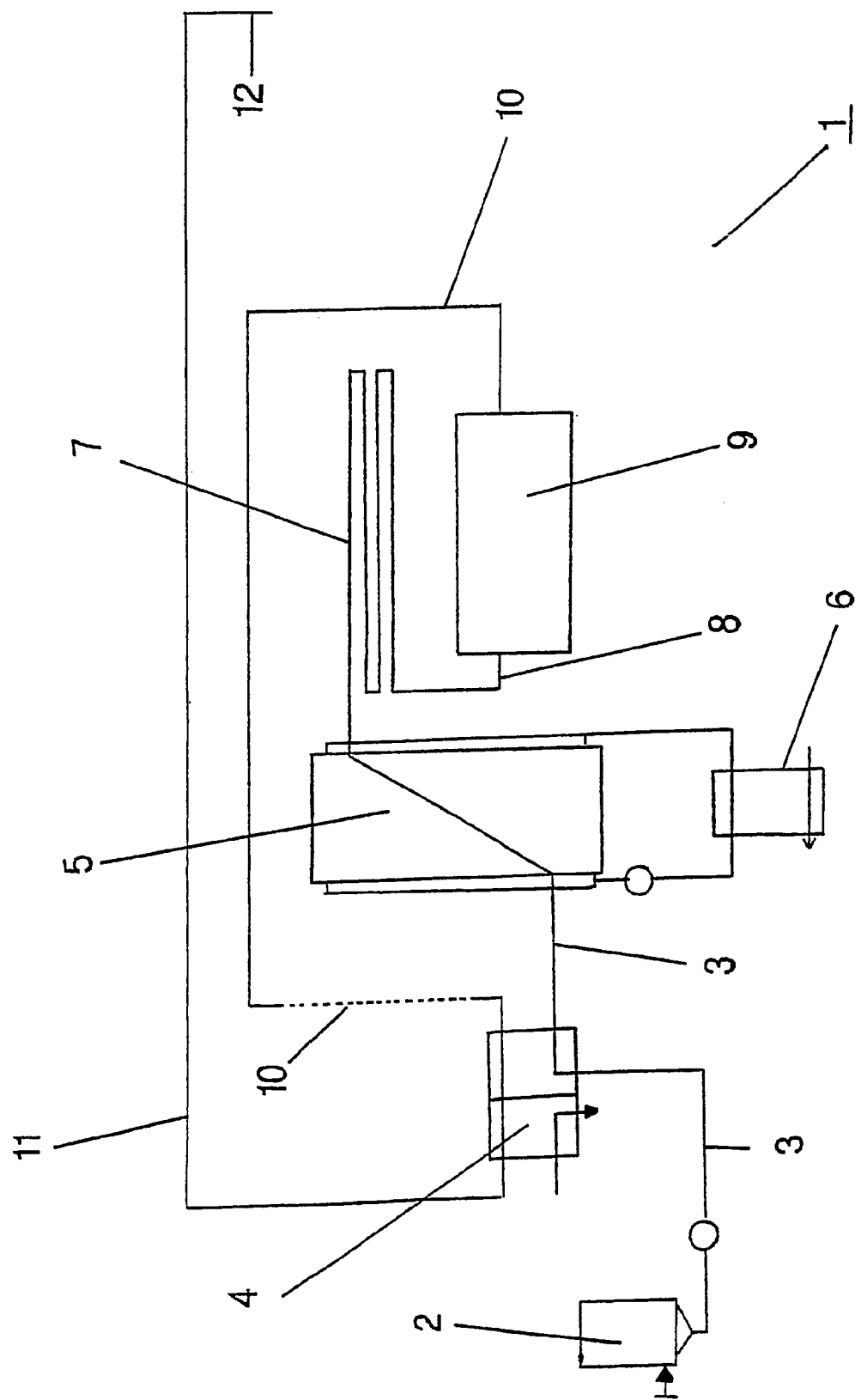

FIG. 1: a schematic representation of the total construction of the micro-particulation device according to the invention.

Figure 2:
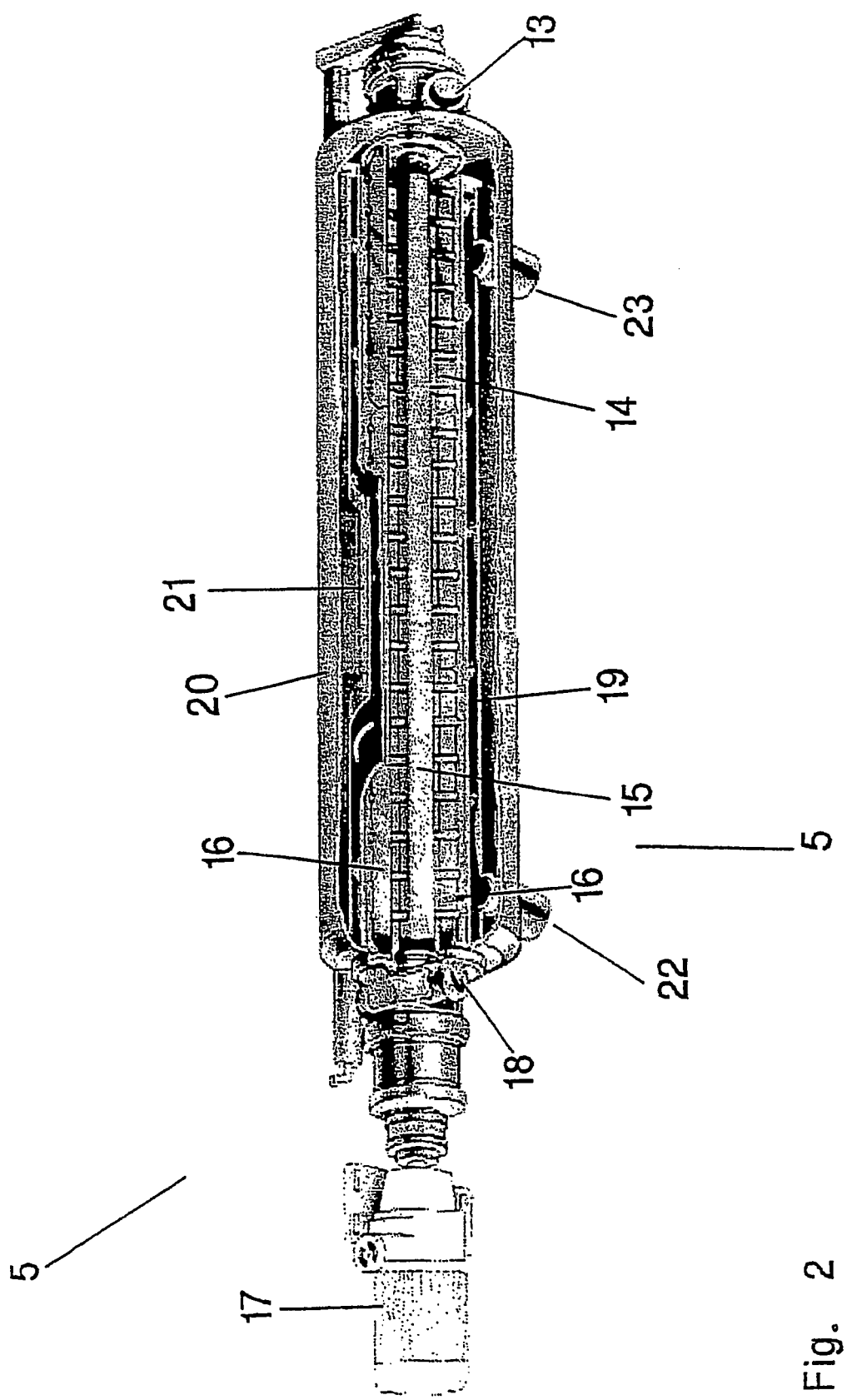

FIG. 2: a sectioned representation of the scraped surface heat exchanger used in the micro-particulation device according to the invention.

Figure 3:
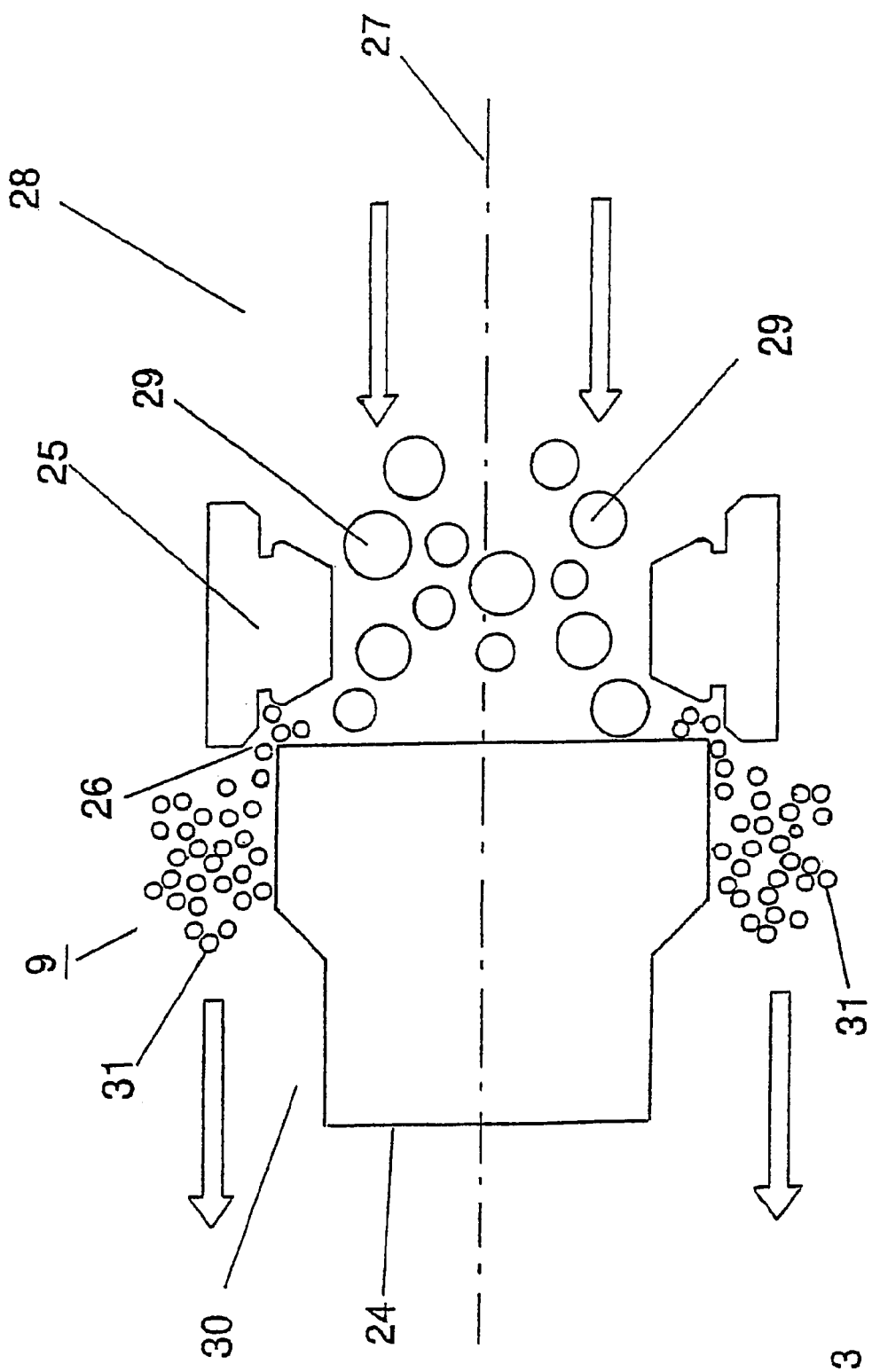

FIG. 3 a schematic cross-sectional representation of the homogenisation device used in the micro-particulation device according to the invention.

DETAILED DESCRIPTION OF THE PREFERRED EMBODIMENTS

The construction of a micro-particulation device 1 is shown schematically in FIG. 1. Filtration residue impinged by pressure flows out of a header container 2 via the residue feed conduit 3, through a plate heat exchanger 4, to the scraped surface heat exchanger 5. The scraped surface heat exchanger 5 is heated with a hot water circuit 6. The sojourn stretch 7 designed as a pipe loop, is located downstream of the scraped surface heat exchanger 5. The sojourn stretch 7 is connected to the homogeniser 9 via the supply conduit 8. The exit of the homogeniser 9 is connected to the plate heat exchanger 4 via the discharge conduit 10. The product lead-out conduit 11 is led from the exit of the plate heat exchanger 4 to the product exit 12 of the micro-particulation device 1.

A detailed representation of the scraped surface heat exchanger 5 may be recognised in FIG. 2. The scraped surface heat exchanger 5 comprises a product entry 13. The product entry 12 leads to the product space 14, in which the rotor 15 with the scrapers 16 is located. The rotor is driven by the motor 17. The product space 14 at the end distant to the product entry 13 has a scraped surface beat exchanger product exit 18. The product space 14 is bordered by a heat exchanger surface 19 which is shaped as the surface of a cylinder. The heat transfer surface 19 with the outer wall 20 of the scraped surface heat exchanger 5 forms the annular gap 21 for the heating medium. The annular gap 21 for the heating medium at the upper end has the heating medium inlet 22, and at the lower end, the heating medium outlet 23.

The homogeniser 9 is represented in a schematic sectioned representation in FIG. 3. The homogeniser 9 consists essentially of the punch 24 and the impact ring 25. The annular gap passage 26 arises between the punch 24 and the impact ring 25. The punch 24 is displaceable in the direction of the longitudinal axis 27, relative to the impact ring 25. In the picture, one may yet recognise the large aggregates 29 of the whey proteins on the high-pressure side 28, before passing the annular gap passage 26, as well as the particulate end product 31 on the low-pressure side 30, after passing the annular gap passage 26.

The initial product 1 of the micro-particulation with the micro-particulation device 1 is the filtration residue of filtered whey collected in the header container 2. The filtration residue is transported out of the header container 2 to the plate heat exchanger 4 via the residue feed conduit 3. The filtration residue is preheated in the plate heat exchanger 4 by way of heat exchanger with the finished product located in the discharge conduit 10. After passage of the filtration residue through the plate heat exchanger 4, this is transported further via the residue feed conduit 3 to the product entry 12 of the scraped surface heat exchanger 5.

The filtration residue gets into the product space 14 via the product entry 13 of the scraped surface heat exchanger 5. The rotor 15 driven via the motor 17, in the product space 14, has the effect that the scrapers 16 attached at the ends of the rotor 15 constantly produce a new thin film of filtration residue on the heat-transfer surface 19. The heat transfer surface 19 thereby is heated by way of the annular gap 21 for heating medium, formed between the heat transfer surface 19 and the outer wall 20 of the scraped surface heat exchanger 5. For this, via the heating medium inlet 22, hot water gets into the annular gap 21 and into the hot water circuit 6 and leaves this again via the heating medium outlet 23. The revolving scrapers 16 driven via the rotor 15 revolve with a low rotational speed, in order to ensure an optimal heat transfer and thereby to consume as little energy as possible. Furthermore, the wear is kept as low as possible by way of this. Practically no particle size reduction is effected in the scraped surface heat exchanger 5 operated with a low rotational speed. A denaturisation and aggregation of the whey proteins is induced in the filtration residue by way of the heat transfer via the heat transfer surface 19. The denatured and aggregated filtration residue subsequently leaves the product space 14 via the product exit 24 and enters into the pipe loop 7.

The filtration residue is kept hot during a sojourn time in the pipe loop 7, in order to bring the aggregate formation to completion. The filtration reside gets into the homogeniser 9 from the pipe loop 7 via the feed conduit 8.

Thereby, the filtration residue at the high-pressure side 28 gets into the homogeniser 9 along its longitudinal axis 27. The filtration residue at the high-pressure side 28 consists essentially of the large aggregates 29 which are unsuitable for further use, such as e.g. the incorporation in cheese or ice cream in place of fat. By way of the pressure gradient which exists between the high-pressure side 28 and the low-pressure side 30, the larger aggregates 29 are pressed through the annular gap passage 26 to the low-pressure side 30. Thereby, the large aggregates 29 are reduced in size according to the width of the annular gap passage 26. The filtration residue on the low-pressure side 30 of the homogeniser 9 consist of a surprisingly large number of particles lying within a tight diameter range, which may be used for further application, such as incorporating in place of fat for example.

The particulate product 31 after passing the annular gap passage 26 is transported via the discharge conduit 10 to the plate heat exchanger 4. The particulate product 31 is cooled in the plate heat exchanger 4 by way of the dissipation of heat to the initial filtration residue coming from the header container 2. The particulate product 31 leaves the plate heat exchanger 4 via the product lead-out conduit 11 in the direction of the product exit 12 of the micro-particulation device 1.

The method for micro-particulation according to the invention, as well as the device for micro-particulation thus produce a significantly higher share of usable particles than the known methods and devices. Due to the operating manner of the scraped surface heat exchanger 5 at a low rotational speed, the scraped surface heat exchanger 5 is subjected to a correspondingly low wear, by which means the costs for maintenance are advantageously reduced.

If for a further use, another nature of the particulate product 31 is required, the punch 24 is, displaced along the longitudinal axis 27 relative to the impact ring 25. The width of the annular gap passage 26 changes by way of this. This in turn has the result that the particulated product 31 obtained on the low-pressure side 20 now has tight size distribution with a mean shifted according to the new width of the annular gap passage 26. In this manner, the micro-particulation device according to the invention may be universally applied for preparing filtration residue for a range of end products such as cheese, ice cream, etc.

LIST OF REFERENCE NUMERALS 1 micro-particulation device
2 header container
3 residue feed conduit
4 plate heat exchanger
5 scraped surface heat exchanger
6 hot water circuit
7 sojourn stretch
8 feed conduit
9 homogeniser
10 discharge conduit
11 product lead-out conduit
12 product exit
13 product entry
14 product space
15 rotor
16 scraper
17 motor
18 scraped surface heat exchanger product exit
19 heat transfer surface
20 outer wall
21 annular gap for heating medium
22 heating medium inlet
23 heating medium outlet
24 punch
25 impact ring
26 annular gap passage
27 longitudinal axis
28 high-pressure side
29 large aggregates
30 low-pressure side
30 particulated product.

The invention claimed is:

1. A method for the micro-particulation of filtration residue comprising:
    a mechanical treatment and a heat treatment of whey proteins in ultra-filtration whey concentrates, wherein the heat treatment and the mechanical treatment are carried out separate from one another with regard to space and time,
    wherein the heat treatment is carried out before the mechanical treatment,
    wherein the heat treatment is carried out in a scraped surface heat exchanger at a selected heater temperature and the filtration residue after the heat treatment and before the mechanical treatment is intermediately stored in a sojourn stretch over a defined time at the temperature level achieved after the scraped surface heat exchanger,
    wherein the mechanical treatment is carried out in a homogenizer that is configured to receive the filtration residue from the sojourn stretch.

2. A micro-particulation method according to claim 1, wherein the scraped surface heat exchanger is heated by a hot water circuit.

3. A micro-particulation method according to claim 1, wherein the scraped surface heat exchanger is operated at a low rotational speed.

4. A micro-particulation method according to claim 1, wherein the mechanical treatment is carried out in the homogenizer with an annular gap passage.

5. A micro-particulation method according to claim 1, wherein additionally, a heat exchange between the filtration element and an end product of the micro-particulation is carried out.

* * * * *